United States Patent [19]

Bareis et al.

[11] Patent Number: 5,911,806
[45] Date of Patent: Jun. 15, 1999

[54] GROOVE STAMPING MACHINE ADAPTABLE TO VARIOUS STATOR AND ROTOR PLATE SIZES

[75] Inventors: Alfred Bareis, Uhingen; Helmut Elsässer, Göppingen; Otto Kurz, Hattenhofen; Wolfgang Mühlhäuser, Rechberghausen; Gerhard Pick, Wäschenbeuren, all of Germany

[73] Assignee: Schuler Pressen GmbH & Co., Germany

[21] Appl. No.: 08/725,165

[22] Filed: Oct. 3, 1996

[30] Foreign Application Priority Data

Oct. 7, 1995 [DE] Germany .......................... 195 37 475

[51] Int. Cl.⁶ .................................................. B26D 5/20
[52] U.S. Cl. ................................ 83/240; 83/241; 83/267; 83/245; 29/898.3
[58] Field of Search .............................. 83/240, 241, 245, 83/267, 76.1, 251, 412; 29/898.3; 384/43

[56] References Cited

U.S. PATENT DOCUMENTS

| | | | |
|---|---|---|---|
| 3,890,863 | 6/1975 | Reihle et al. | 83/251 |
| 3,906,826 | 9/1975 | Middendorf | 83/267 |
| 4,434,693 | 3/1984 | Hosoi et al. | 83/412 |
| 4,516,447 | 5/1985 | Schneider et al. | |
| 4,602,541 | 7/1986 | Benzinger et al. | 83/251 |
| 4,879,894 | 11/1989 | Benedict et al. | 83/412 |

FOREIGN PATENT DOCUMENTS

| | | |
|---|---|---|
| 0 171 700 | 2/1986 | European Pat. Off. . |
| 0 307 080 | 3/1989 | European Pat. Off. . |
| 23 53 730 | 5/1975 | Germany . |
| 24 11 439 | 9/1975 | Germany . |
| 26 04 639 | 8/1977 | Germany . |
| 29 19 687 | 11/1980 | Germany . |
| 34 29 692 | 2/1986 | Germany . |

Primary Examiner—M. Rachuba
Attorney, Agent, or Firm—Evenson, McKeown, Edwards & Lenahan, P.L.L.C.

[57] ABSTRACT

A groove stamping machine stamps the required grooves successively into a disk-shaped blank particularly for manufacturing stator and rotor plates for electric machines. The groove stamping machine has a stationary bench which, on the end side, carries a spacing apparatus for receiving the blank. A stamping device disposed on the bench is adjustable with respect to the spacing apparatus. The distance between the spacing apparatus and the stamping device can be adjusted by a ball thread spindle which acts between the spacing apparatus and the stamping device. The fixing of an adjusted distance takes place by the blocking of the ball thread spindle, preferably by way of a disk brake. The stamping device is disposed via a combined roller slide bearing on the bench which permits a low-friction displacement of the stamping device which also supporting the latter in a stiff manner. The combination of the low-friction bearing device and the ball thread spindle, which is preferably arranged close to the blank, permits a precise adjustment and constant maintenance of the desired machining radius. The precision and the compensation of temperature fluctuations also results from the ball thread spindle being preferably arranged in an exposed manner, that is, in a thermal contact with the environment.

12 Claims, 5 Drawing Sheets

GROOVE STAMPING MACHINE ADAPTABLE TO VARIOUS STATOR AND ROTOR PLATE SIZES

BACKGROUND AND SUMMARY OF THE INVENTION

The present invention relates to a groove stamping machine for stamping stator plates, rotor plates, core plates and similar grooved metal plates for electric motors and transformers.

Several processes are known for producing grooved stator and rotor plates for electric machines as well as transformer plates. In these processes, an individual stator plate and rotor plate are obtained in steps by being stamped from a single sheet metal blank. During the implementation of this process, the individual grooves of the respective section of the blank which is part of the future stator or rotor plate are stamped successively.

A groove stamping machine, which is set up for such a manufacturing of stator and rotor plates, is described in DE-OS 29 19 687. This groove stamping machine has a stationarily disposed groove stamping device with exchangeable tools to which a spacing apparatus is assigned. The spacing apparatus is used for the holding of a workpiece to be machined which is formed by a disk-shaped blank (sheet metal blank). The disk-shaped blank is held by the spacing apparatus in a horizontal plane and is disposed to be rotatable about a vertical axis. The spacing apparatus adjusts the workpiece in steps about the vertical axis while the groove stamping press stamps a groove after each adjusting step. For an adaptation to different plate or workpiece diameters, the spacing apparatus is disposed to be adjustable away from and toward the groove stamping device.

When very small stator and rotor plates are to be stamped, the spacing apparatus must be moved very close to the groove stamping device. This may impair the access possibilities of an operator with respect to the workpiece.

DE 26 04 639 C2 describes a workpiece arrangement for producing grooved plate segments, and having a stationarily disposed groove stamping device with a stationary bench fastened thereto. A spacing apparatus for the holding and angular adjustment of the core plate to be stamped is disposed on the bench and can be adjusted toward and away from the groove stamping device. In this known arrangement which in principle corresponds to the above-described groove stamping machine, the bench extends relatively far away from the groove stamping device. The bench therefore makes the access to the workpiece more difficult.

Furthermore, it was found to be difficult in the case of groove stamping machines with an adjustable spacing apparatus to manufacture core plates with a fairly high precision. Groove stamping machines frequently operate with relatively high stamping frequencies. In this case, relatively high masses are considerably accelerated in a constantly repeated manner and are braked again. The high operating speed is required for achieving a high output also in the case of a serial, that is, successive stamping of individual grooves. A machining precision is desired which, in the individual case, may be in the micrometer range, in which case, if possible, the stator or rotor plates should be usable without any finishing. Also if possible, the machining precision should be ensured in a constant manner without any readjustment. Further, the groove stamping machine must be adaptable in a simple manner to different stator or rotor plate sizes and shapes.

It is an object of the present invention to provide a groove stamping machine which, in a simple manner, can be adapted to different stator and rotor plate sizes and in the process, permits a high production output as well as a good machining precision.

This object has been achieved in accordance with the present invention by the provision of a groove stamping machine having an oblong bench which can be arranged in a stationary manner and on whose one end a workpiece holding device is arranged on the top side, having clamping devices provided on the workpiece holding device for the chucking and positioning of workpieces, having a stamping device which is arranged to be longitudinally adjustable on the bench in a direction away from the workpiece holding device and toward the workpiece holding device and which can be equipped with a tool for machining the workpiece, having a low-friction, stiff bearing device which is arranged between the bench and the stamping device, having a transmission device for adjusting the distance between the workpiece holding device and the stamping device which with one end is supported on the workpiece holding device in the proximity of the clamping devices and with its other end is supported on the stamping device in the proximately of the tool.

The groove stamping machine has a bench on which a workpiece holding device, which is preferably constructed as a spacing apparatus, is disposed in a stationary manner. In contrast, the stamping device is disposed on the bench in an adjustable manner and can therefore be displaced toward the spacing apparatus and away therefrom. As the result of the adjustability of the distance between the spacing apparatus and the stamping device, workpieces with different diameters can be processed. In this event, the workpiece is always mounted on the stationarily disposed spacing apparatus at the same point so that stator or rotor plates with a small diameter are also easily accessible. During the cutting or stamping operation, the stamping device of the groove stamping machine is disposed in a floating manner.

For processing workpieces, the stamping press is moved closer to the spacing apparatus, while otherwise it is arranged to be farther away from the spacing apparatus which is formed by a supporting table provided with corresponding clamping devices and does not change its position during the adjustment of the workpiece size. The stamping device is supported on the bench by way of a low-friction and rigid bearing device. As a result of the low friction, particularly a low static friction, a very precise adjustment is permitted of the distance between the stamping device and the supporting table. This permits high processing precision on the workpiece, whereas the rigidity of the bearing device permits high operating speed of the stamping device which goes along with high mass accelerations, acceleration forces and resulting shock loads of the bearing device.

For adjusting the distance between the supporting table and the stamping device, a transmission device is arranged at a narrow distance to the workpiece between the stamping device and the supporting table. The transmission device determines the distance between the stamping device and the supporting table. Vibrations or other deformations of the bench, the supporting table and particularly of the stamping device do not substantially affect the adjusted distance. A warping or bending of the bench, for example, as the result of a heating of the bench on its top side when its bottom side remains cool, does not result in a corresponding change of the distance of the stamping device from the supporting table. On the contrary, the distance is determined by the transmission device. Other length changes caused by forces or the effect of heat are compensated by way of the bearing device and do not, or only very little, impair the precision during the manufacturing of the core plates.

The transmission device can be constructed as a threaded spindle, preferably a ball thread spindle. As a result of a mechanical prestressing, this spindle is constructed free of play and with little friction. The ball thread spindle is rotatably disposed, for example, on the workpiece holding device, and a ball circulating nut is connected with the stamping machine. The distance between the rotatable end-side bearing of the ball thread spindle and the nut defines the effective length of the transmission device or, more concretely, of the threaded spindle. When this effective length corresponds to the distance of the rotation axis of the spacing apparatus (or workpiece holding device) and the stamping tool stamping the grooves, the influences of temperature changes on the machining precision can be reduced. With the same temperature change of the workpiece and the spindle, their length changes are also approximately the same so that the stamping operation takes place with a good precision at the point provided for this purpose.

For the foregoing purpose, the transmission device, particularly the threaded spindle, can be advantageously arranged such that, during the operation of the stamping machine, it can essentially assume the ambient temperature. That is, the transmission device or the threaded spindle is arranged to be exposed to the ambient air. In addition, the transmission device can be insulated with respect to heat sources of the stamping machine. An insulation is achieved, for example, by the absence of a massive connection between heat sources and the ball circulating nut or a corresponding transmission element. It is assumed that, because of the storage, workpieces have an ambient temperature. When the ball thread spindle also assumes ambient temperature, the temperatures will be the same. Temperature changes within the course of a workday therefore impair the machining precision little or not at all because of the same-length changes.

When the threaded spindle is arranged with its longitudinal axis at a narrow distance from the workpiece to be machined, a particularly stiff coupling of the stamping device to the spacing apparatus is achieved. The distance between the two is largely unaffected by vibrations and deformations of the rest of the groove stamping machine.

Although it is basically possible to determine a distance adjusted by the threaded spindle or generally the transmission device by fixing the stamping device on the bench, the transmission device, i.e. particularly the ball thread spindle, is advantageously configured in a blockable manner. For this purpose, a controllable braking device can be used which affects the threaded spindle. Length changes or bending of the bench will then cause no change of the distance between the stamping device and the workpiece holding device or spacing apparatus.

This braking device should be dimensioned such that the threaded spindle is held in a non-rotatable manner when the braking device is operated. Shocks or vibrations occurring during the operation of the groove stamping device must be reliably absorbed without the occurrence of a rotation of the threaded spindle. The distance between the spacing apparatus and the groove stamping device, and thus the radius of the grooves to be stamped, is adjusted in a reliable and precise manner.

If a spring-loaded disk brake is used as the braking device, which preferably can be released electrically, a particularly stiff and precise blocking of the threaded spindle can be achieved. The operation of brake shoes, which are part of the disk brakes, takes place orthogonally with respect to the rotating direction so that an adjusted rotating position of the threaded spindle cannot be displaced or shifted by the operation of the brake shoes.

For the implementation of the rigid and low-friction bearing device, roller bearings with an additional stiffening were found to be particularly useful. The bearing device, which is preferably constructed as guide rollers, permits a low-friction and particularly almost static-friction-free displacement of the stamping device on the bench. For stiffening the bearing device, additional slide elements are provided which, when the stamping device is inoperative, are at a narrow distance from the corresponding slideways or rest against them without any contact pressure force. This slight play, which therefore usually exists between the slide elements and the slideways, has the result that almost no friction occurs during the displacement of the stamping device. Vibrations caused by the operation of the stamping device result in elastic deformations of the rollers or other rolling bodies. The slide elements are placed on the slideways and/or are pressed there against which, on the one hand, causes a stiff coupling of the stamping device to the bench and, on the other hand, relieves the rolling bodies. A destruction of the rolling bodies and a deformation of the roller paths is thereby prevented.

BRIEF DESCRIPTION OF THE DRAWINGS

These and other objects, features and advantages will become more apparent from the following detailed description of the presently preferred embodiments when taken in conjunction with the accompanying drawings wherein:

FIG. 1 is a side schematic view of a groove stamping machine for stamping stator or rotor plates for electric machines such as motors, transformers and the like;

DETAILED DESCRIPTION OF THE DRAWINGS

Figure 1:
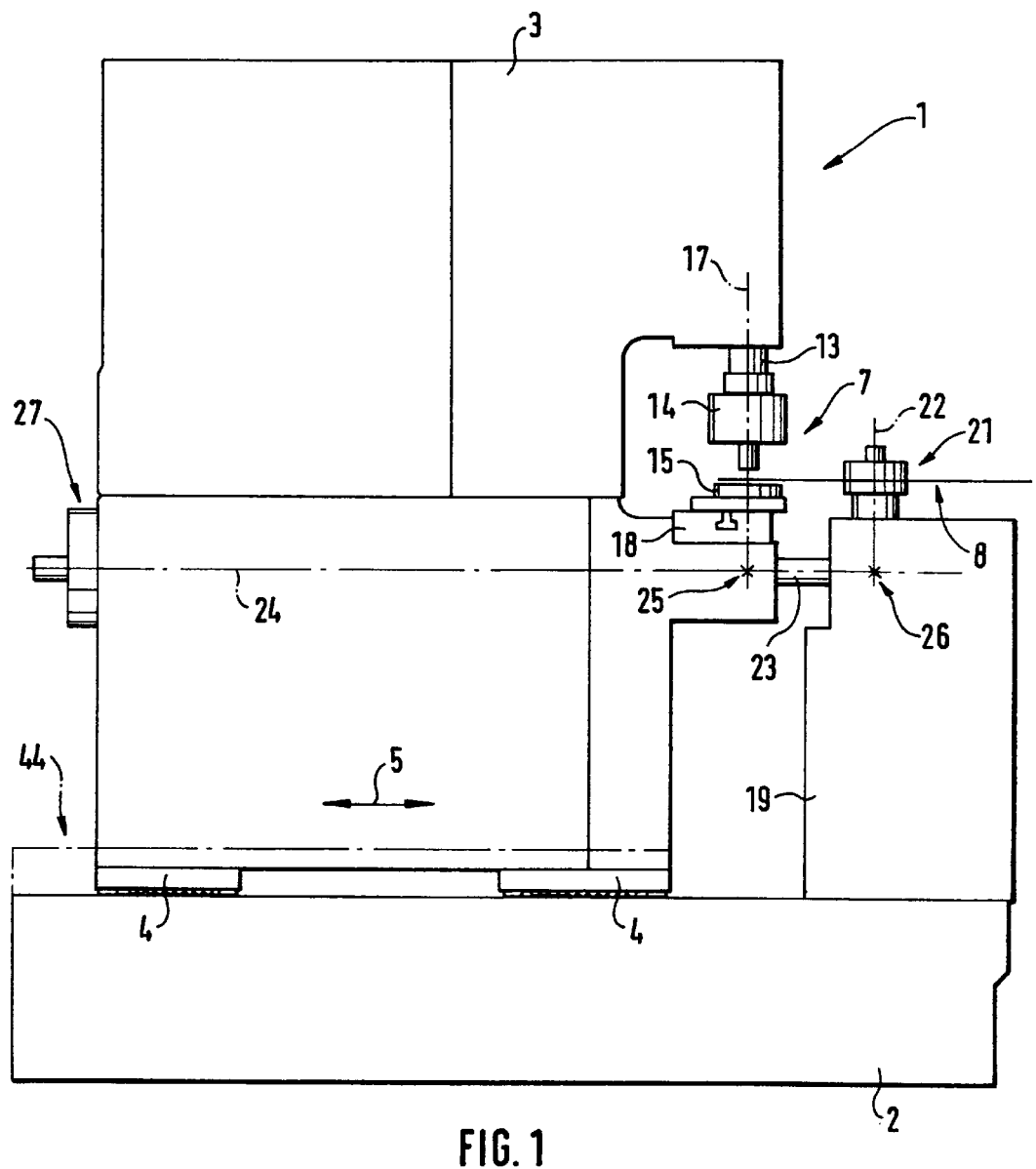
Figure 3:
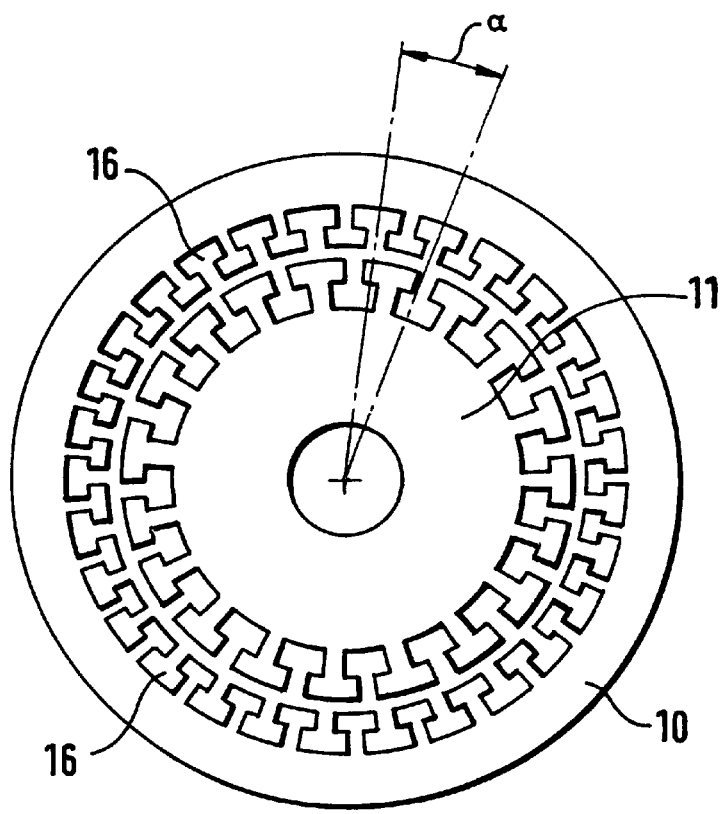
FIG. 3 is a schematic top view of a set of stator and rotor plates stamped out of a blank according to FIG. 2.

FIG. 1 illustrates a groove stamping machine designated generally by numeral 1 for stamping electric machine stator or rotor plates of the type shown in FIG. 3. The groove stamping machine 1 has a stamping device 3 disposed on a bench 2. The stamping device 3 is supported on the bench 2 by bearing devices 4 and can be moved in the direction indicated by the arrow 5.

Figure 2:
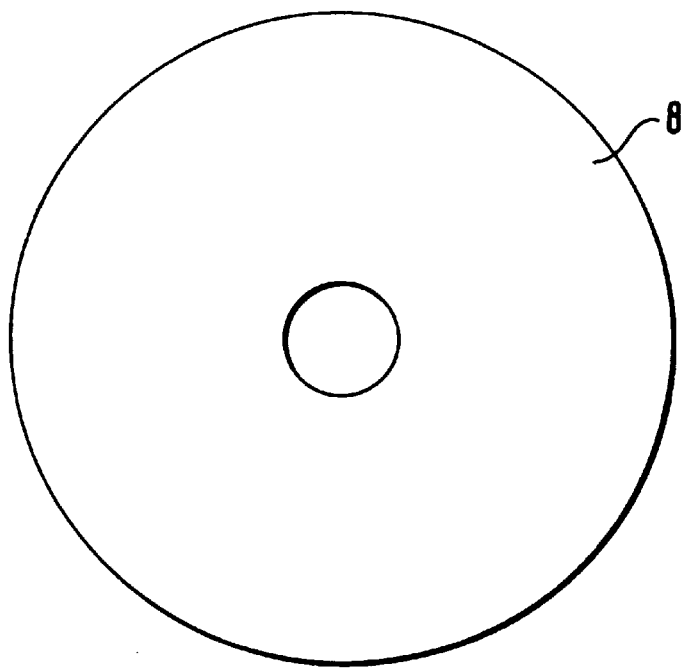
FIG. 2 is a top view of a different scale of a blank for stator or rotor plates to be machined on the groove stamping machine according to FIG. 1.

On its front side shown on the right in FIG. 1, the stamping device 3 is equipped with a stamping tool designated generally by numeral 7 which produces, in a sequence of stamping operations, the plates illustrated in FIG. 3 from a blank 8 illustrated in FIG. 2, specifically a stator plate 10 and a rotor plate 11. For this purpose, the stamping tool 7 has a top tool part 14 fastened on a slide 13 and a bottom tool part 15. The top tool part 14 and the bottom tool part 15 are constructed to complement one another and have the outer contour of the recesses 16 which are illustrated in FIG. 3 and are to be stamped out of the blank 8.

The slide 13 with the top tool part 14 is periodically moved up and down along an axis 17, and the bottom tool part 15 is stationarily disposed with respect to the stamping device 3 on a corresponding table 18. For holding the blank 8 or the partially finished core plates, a spacing apparatus 19 used as the workpiece holding device is arranged opposite the front side of the stamping device 3 shown on the right in FIG. 1 and is fixedly connected with the bench 2. The spacing apparatus 19 has a clamping device 21 for receiving the blank 8. The clamping device 21 is rotatable about a vertical axis 22 arranged parallel to the axis 17. The spacing apparatus 19 therefore permits a rotation of the blank 8 about the vertical axis 22 and a relaying of the blank 8 through selected angular positions between press strokes.

The machining diameter of the blanks 8 to be machined, i.e., the distance between the axis 17 and the vertical axis 22, is carried out by adjusting the stamping device 3 in the direction of the arrow 5. Correspondingly, the stamping device 3 is moved on the bench 2 toward the spacing apparatus 19 or away therefrom. A linear drive adjusts the distance between the stamping device 3 and the spacing apparatus 19 and thus the distance between the axis 17 and the vertical axis 22. In the illustrated embodiment, a prestressed, no-play ball thread spindle 23 is used as the linear drive which is indicated in FIG. 1 by its horizontal axis of rotation 24. The axis of rotation 24 intersects each of the axis 17 and the vertical axis 22 at a right angle at intersection points 25, 26. Close to the intersection point 26, the ball thread spindle 23 is disposed in a rotatable manner. Close to the intersection point 25, a ball thread spindle is connected with the stamping device 3. The distance between the rotatable bearing (schematically represented by intersection point 26) and the ball circulating nut (schematically represented by intersection point 25) is essentially identical to the distance between the axis 17 and the vertical axis 22.

The ball thread spindle 23 is connected with a handwheel or with an electric actuator which permits a targeted rotation and thus an adjustment of the distance between the stamping device 3 and the spacing apparatus 19. The driving device includes a disk brake 27 which is elastically prestressed to its braking or blocking position. An electric releasing device permits a targeted release of the disk brake 27.

After a disk-shaped blank 8 has been placed in the clamping device 21 and fixed therein, the operation of the stamping device 3 is started. As a result, the slide 13 is lowered at a high speed and the top tool part 14 stamps a first recess into the blank 8. As soon as the slide 13 has moved back so far in an opposite movement that the top tool part 14 has moved out of the bottom tool part 15 and out of the blank 8, the spacing apparatus 19 advances the blank 8 by a spacing angle α which is illustrated in FIG. 3. In this angular position, the slide 13, by way of the top tool part 14, stamps a second groove into the blank 8. This operation is repeated in a fast sequence until all grooves are stamped and the stator plate 10 is therefore separated from the rotor plate 11. Because of the high operating speed of the stamping device 3, the above-described operation takes a very short time. The stamping of the additional grooves takes place corresponding to the pertaining spacing angles.

An adjustment of the groove stamping machine 1 to different core plate sizes takes place by the rotation of the ball thread spindle 23. For this purpose, the disk brake 27 is released by a corresponding control and the electric drive is controlled such that the distance between the axis 17 and the vertical axis 22 assumes the desired machining radius. This can, for example, be the air gap radius of the core plates to be produced. After the adjustment has taken place, the disk brake 27 is applied, whereby the distance between the stamping device 3 and the spacing apparatus 19 is fixed.

During the adjustment of the distance, the stamping device 3 rolls by its bearing devices 4 on the bench 2 in a low-friction manner and almost without any static friction. Even after the blocking of the ball thread spindle 23 has taken place, the stamping device 3 is not fixedly connected to the bench 2. The distance between the axis 17 and the vertical axis 22 is defined only by the ball thread spindle 23.

The active length of the ball thread spindle 23 defined as the distance between the intersection points 25, 26 corresponds essentially to the machining radius (air gap radius) of the stator and rotor plates. Consequently, temperature changes for processing precision have no influence if only the ball thread spindle 23 and the blank 8 have essentially the same temperature. In order to ensure this, the ball thread spindle 23 is exposed along almost its entire active length or at least a significant section of this length. In this area, the ball thread spindle is connected with the ambient air and essentially assumes its temperature. The workpieces to be machined (i.e. the blanks 8) have the same temperature because the storage normally takes place close to the groove stamping machine 1. If, for example, the ambient temperature rises in the course of a work day, the ball thread spindle 23 and the blanks 8 will also warm up, whereby the distance between the axis 17 and the vertical axis 22 will increase to the extent to which the blanks 8 expand, thereby ensuring a high machining precision. Ready-to-use stator and rotor blanks can therefore be manufactured without any finishing.

Figure 4:
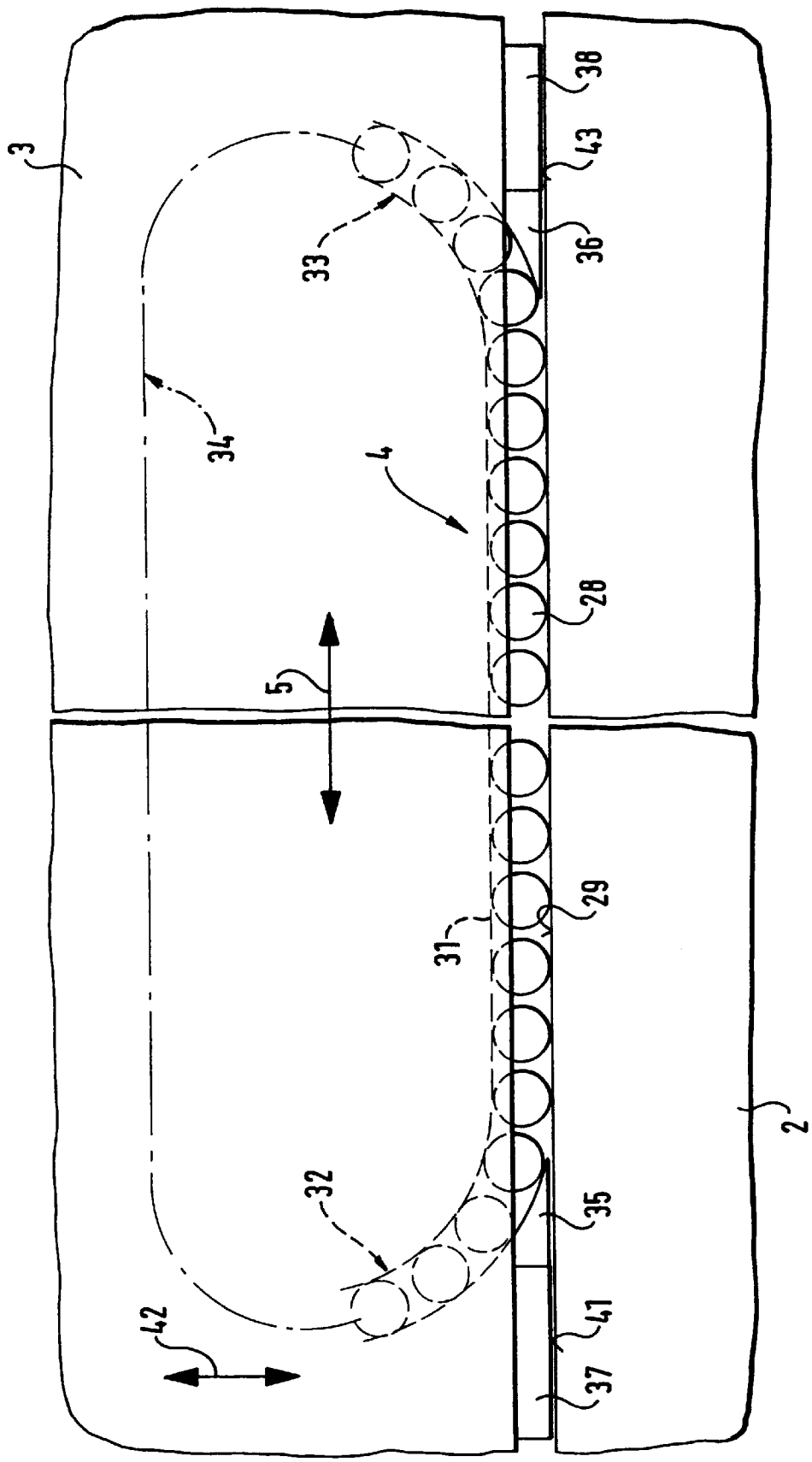
FIG. 4 is a side schematic view on a different scale of a stiff and low-friction bearing device pertaining to the groove stamping machine according to FIG. 1.

The bearing device 4 is shown in detail in FIG. 4 and comprises a combined roller slide bearing device. Rollers 28 are used as roller bodies which move on a roller path 29 provided on the bench 2. On its underside, the stamping device 3 is also provided with a roller path 31 which rests on the rollers 28. The roller path 31 is closed by way of corresponding bypass ducts 32, 33 and an only schematically indicated roller return duct 34 to form a linear system. For leading the rollers 28 into and out of the bypass ducts 32, 33, molded bodies 35, 36 are used which are arranged on both ends of the roller path 31.

In addition to the linear-system roller bearing formed so far, slide elements 37, 38 are arranged on both sides which are each fixedly connected with corresponding parts of the stamping device 3. The slide element 37 has a flat underside 41 which is at a narrow distance opposite the planely constructed roller path 29. A gap of approximately two hundredths of a millimeter exists between the underside 41 and the roller path 29. In the vertical direction, which is indicated in FIG. 4 by an arrow 42, the slide element 37 is extremely stiff. Its stiffness is considerably higher than that of the rollers 28 carrying the stamping device 3. The same applies to the slide element 38 which is arranged with its underside 43 at a narrow distance from the roller path 29.

By way of a conventional lubricating device 44 which is outlined schematically in FIG. 1 and which, in the simplest case, can be constructed as an oil pan, a large amount of oil is guided to the bearing devices 4. Particularly the gap constructed in each case between the slide elements 37, 38 and the roller path 29 is filled with oil. The lubricating device may also have another construction, in which case, for achieving good damping characteristics, at least the gap should carry oil.

The bearing device described thus far is moved in a low-friction manner and almost without any static friction in the direction of the arrow 5 and is also very stiff. The underside 41, 43 of the slide elements 37, 38 do not rest against the roller path 29 and, in particular, are not pressed there against. The weight of the stamping device 3 rests only on the rollers 28 which, in turn, are supported on the roller path 29.

Strong shock loads in the direction of the arrow 42 which occur during the operation of the stamping device 3 are, however, absorbed by the slide elements 37, 38. The narrow, oil-filled gap formed between the undersides 41, 43 and the roller path 29 which maximally amounts to a few hundredths of a millimeter couples the stamping device 3 stiffly to the bench 2. The oil filling cannot be displaced by a pressure load or at least, a short-term pressure load. Therefore, both gaps are inflexible in the vertical direction indicated by arrow 42. Occurring shock loads are absorbed by the slide elements 37, 38 without any excessive stressing of the rollers 28. In particular, periodically recurring stress to the rollers 28 leading to a deformation of the roller path 29 is avoided.

Also during the operation of the stamping device 3, a displacement of the stamping device 3 with respect to the bench 2 occurs in the direction of the arrow 5. Such displacements may occur because of thermal expansions, bending of the bench, for example, by a non-uniform heating or similar occurrences and the like. A displacement of the groove stamping device with respect to the bench is not blocked but is used for the compensation of occurring tensions. The distance between the vertical axis 22 and the axis 17 of the stamping tool 7 is determined nevertheless only by the threaded spindle 23 which ensures the precision of the machining operation.

In summary, particularly for producing stator and rotor plates 10, 11 for electric machines and the like, a groove stamping machine 1 is provided which stamps the required grooves successively into a disk-shaped blank 8. The groove stamping machine has a bench 2 which can be set up in a stationary manner and which, on the end side, carries a spacing apparatus 19 for receiving the blank 8. A stamping device 3 is disposed on the bench 2 which can be adjusted with respect to the spacing apparatus 19. The distance between the spacing apparatus 19 and the stamping device 3 can be adjusted by a ball thread spindle 23 which acts between the spacing apparatus and the stamping device 3.

The fixing of an adjusted distance takes place by blocking the ball thread spindle 23, preferably via a disk brake 27. The stamping device 3 is disposed on the bench 2 by a combined roller slide bearing, which permits a low-friction displacement of the stamping device 3 and which also holds it in a stiff manner. The combination of the low-friction bearing device with the ball thread spindle 23 preferably arranged close to the blank 8 permits a precise adjustment of the desired machining radius and its constant maintenance. The precision and compensation of temperature fluctuations is also promoted by the fact that the ball thread spindle 23 is preferably arranged to be exposed, that is, is in a thermal contact with the environment.

Figure 5:
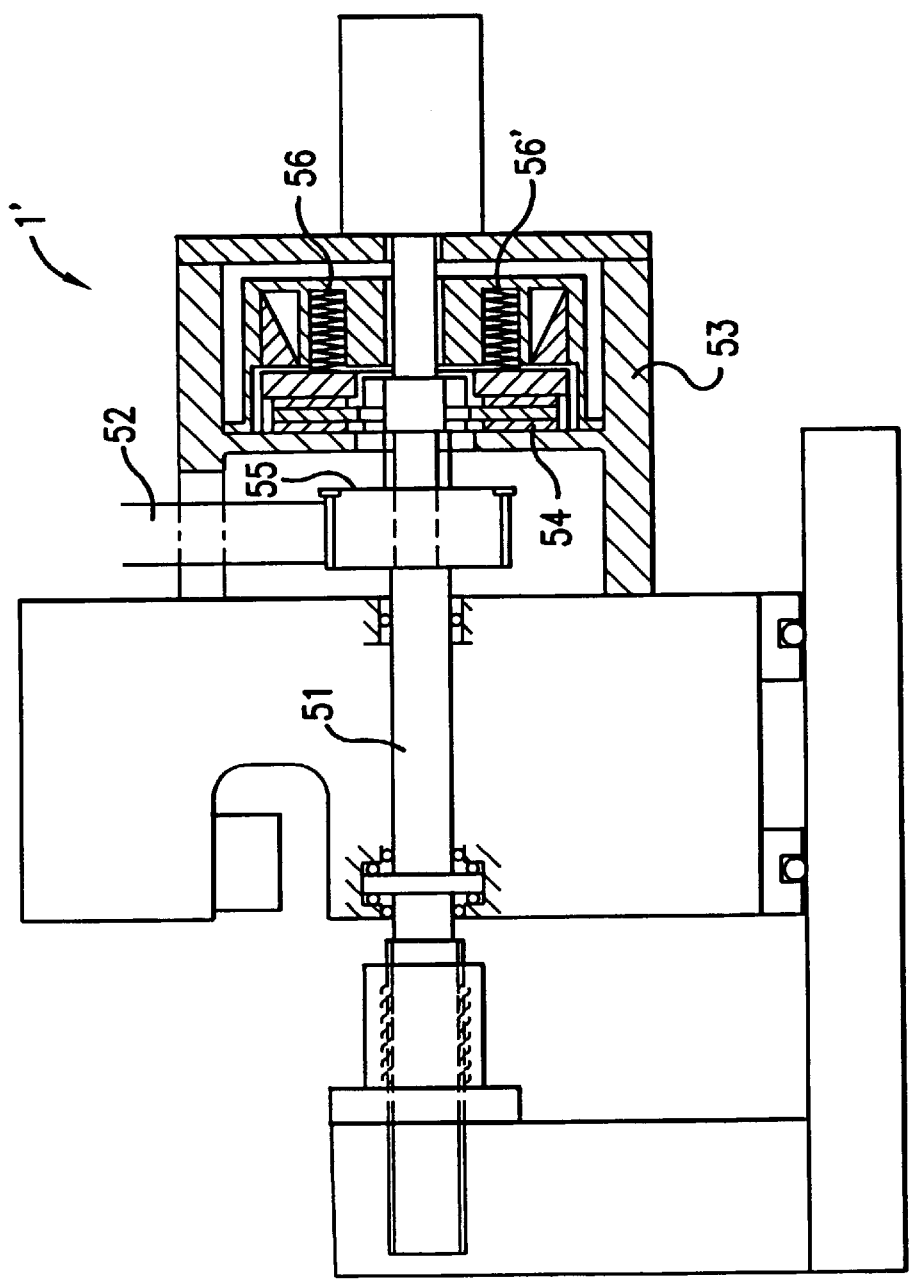
FIG. 5 is a schematic side view of the stamping machine having a belt drive, a ball threaded spindle and a brake.

In FIG. 5, the stamping machines designated generally by the numeral 1' has a threaded spindle 51 as the transmission device which includes a belt 52. A controllable brake device 53 includes a friction carrier 54 and a brake pedal 55. Pressure springs 56, 56' provide for spring-loading in the brake device 53.

Figure 6B:
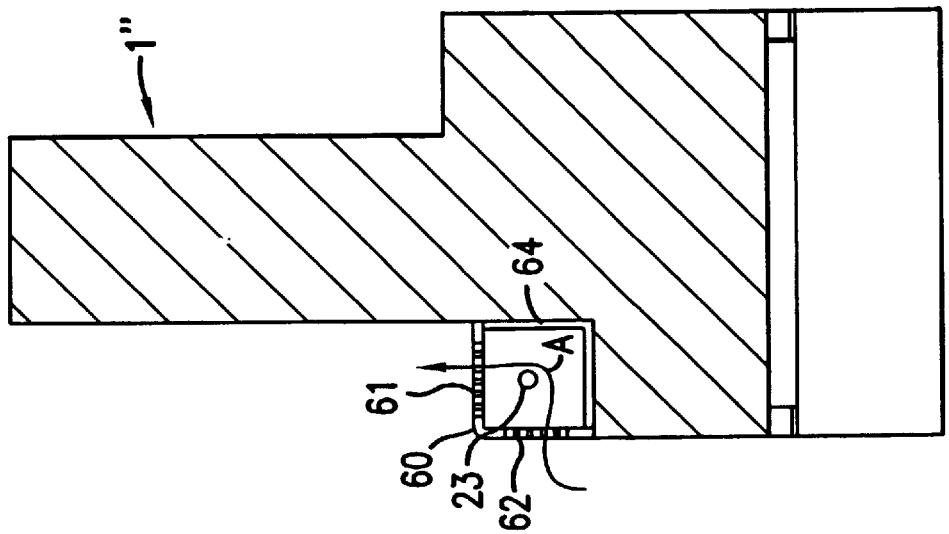
FIGS. 6A and 6B are schematic side and partial cross-section views, respectively, of the stamping machine showing heat insulation.
Figure 6A:
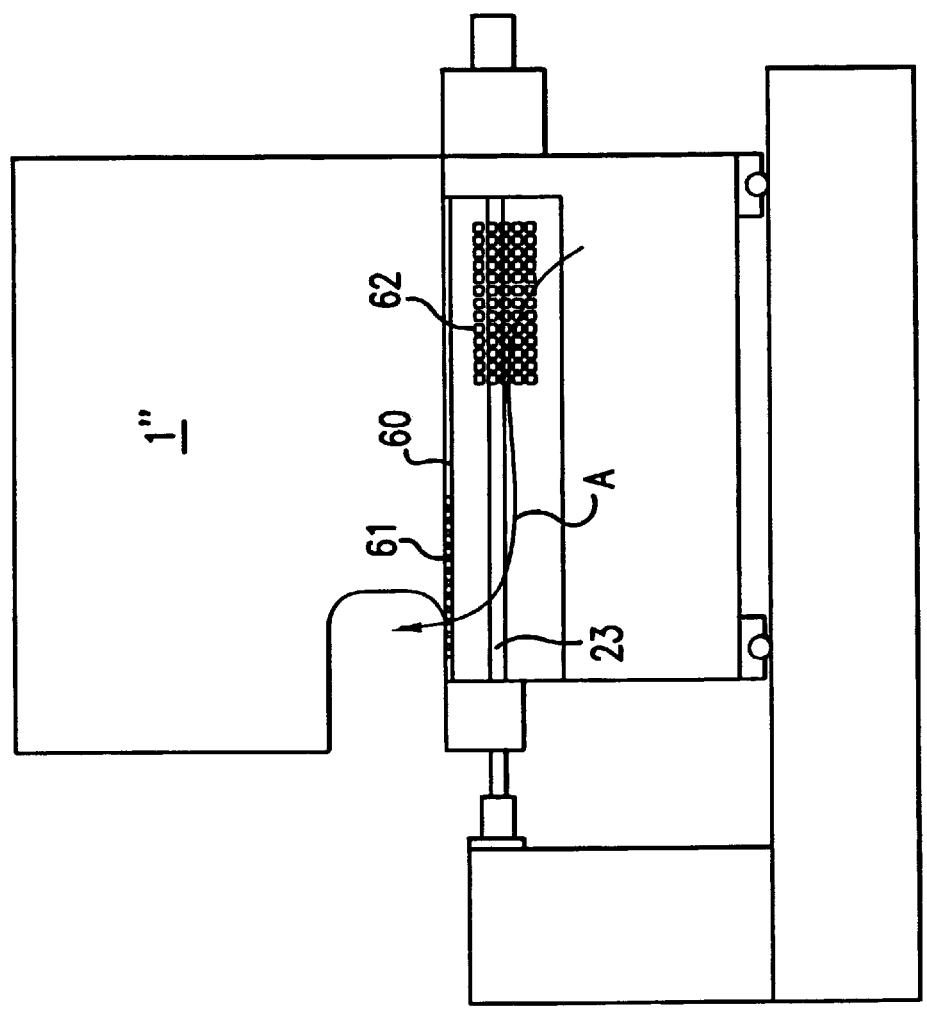

FIGS. 6A and 6B show the stamping machine 1" having a cover 60 with a series of ventilating holes 61, 62 for natural convection as shown by the arrow A. Heat insulation 64 is provided to insulate the transmission from the heat sources in the stamping machines.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Groove stamping machine, for stamping items including stator and rotor plates for electric machines, comprising
 a stationary oblong bench on one end and top of which is arranged a workpiece holding device;
 clamping devices provided on the workpiece holding device for chucking and positioning of workpieces;
 a stamping device longitudinally adjustably arranged on the bench in a direction toward and away from the workpiece holding device, and having a tool for machining the workpiece,
 a low-friction, stiff bearing device arranged between the bench and the stamping device; and
 a transmission device for adjusting the distance between the workpiece holding device and the stamping device having one end supported on the workpiece holding device in proximity to the clamping devices and another end supported on the stamping device in proximity to the tool;
 wherein the stamping device includes means for being floatingly disposed on the bench with the transmission device locked, and the transmission device is arranged to be provided with ambient air during operations of the stamping machine and to be insulated relative to heat sources of the stamping machine.

2. The groove stamping machine according to claim 1, wherein the workpiece holding device comprises an optionally lockable spacing apparatus for rotating a clamped workpiece stepwise about an axis.

3. The groove stamping device according to claim 1, wherein the transmission device comprises a threaded spindle.

4. The groove stamping device according to claim 1, wherein the transmission device is sized to have an effective length which substantially corresponds to a predetermined measurement to be maintained during stamping the workpiece.

5. The groove stamping machine according to claim 1, wherein the transmission device is exposedly arranged on the stamping machine.

6. The groove stamping machine according to claim 3, wherein a longitudinal axis of the threaded spindle is arranged at a relatively narrow distance from the workpiece to be machined.

7. The groove stamping machine according to claim 4, wherein a controllable brake device is operatively connected with the threaded spindle.

8. The groove stamping machine according to claim 7, wherein the brake device has a capacity dimensioned such that, when operated, the threaded spindle is non-rotatably held with occurrence of vibrations during operation of the stamping machine.

9. The groove stamping machine according to claim 8, wherein the brake device comprises a spring-loaded disk brake.

10. The groove stamping machine according to claim 1, wherein the bearing device comprises a roller bearing configured with a pressure-stressable stiffening.

11. The groove stamping machine according to claim 1, wherein the bearing device and a slide device support the stamping device.

12. The groove stamping machine according to claim 1, wherein the bearing device is a roller guide having slide elements.

* * * * *